United States Patent [19]

Kamohara et al.

[11] Patent Number: 4,585,620

[45] Date of Patent: Apr. 29, 1986

[54] WEAR-RESISTANT ALLOY FOR AN ATOMIC POWER PLANT

[75] Inventors: Hisato Kamohara, Yokohama; Tatsuyoshi Aisaka, Ebina; Mituo Kawai, Yokohama, all of Japan

[73] Assignee: Tokyo Shibaura Denki Kabushiki Kaisha, Kawasaki, Japan

[21] Appl. No.: 386,534

[22] Filed: Jun. 9, 1982

[30] Foreign Application Priority Data

Jun. 15, 1981 [JP] Japan ................................ 56-90916

[51] Int. Cl.$^4$ ............................................ C22C 19/05

[52] U.S. Cl. .................................... 420/442; 148/427; 148/442; 420/453; 420/584; 420/588

[58] Field of Search ............... 420/442, 453, 584, 588; 148/410, 419, 427, 442

[56] References Cited

U.S. PATENT DOCUMENTS

| | | | |
|---|---|---|---|
| 3,069,258 | 12/1962 | Haynes | 420/453 |
| 3,914,867 | 10/1975 | Manning et al. | 420/442 |

FOREIGN PATENT DOCUMENTS

| | | |
|---|---|---|
| 0057242 | 8/1982 | European Pat. Off. . |
| 2197686 | 3/1974 | France . |
| 53-9218 | 1/1978 | Japan . |
| 1019679 | 2/1966 | United Kingdom . |
| 1078444 | 8/1967 | United Kingdom . |
| 1320775 | 6/1973 | United Kingdom . |
| 2005305 | 4/1979 | United Kingdom . |
| 2023652 | 1/1980 | United Kingdom . |
| 2039950 | 8/1980 | United Kingdom . |

*Primary Examiner*—R. Dean

*Attorney, Agent, or Firm*—Schwartz, Jeffery, Schwaab, Mack, Blumenthal & Evans

[57] ABSTRACT

There is disclosed a wear-resistant alloy which comprises, in terms of weight ratio, 10 to 45% of chromium, 3 to 15% of niobium, 4 to 20% of molybdenum, 0.01 to 2.0% of boron, and nickel as the remainder.

The wear-resistant alloy having a novel composition of the present invention is suitable for face portions of valves used in various plants such as a chemical plant and an atomic power plant, parts of jet pumps and sliding parts for various machines.

7 Claims, No Drawings

WEAR-RESISTANT ALLOY FOR AN ATOMIC POWER PLANT

BACKGROUND OF THE INVENTION

The present invention relates to a wear-resistant alloy having a novel composition suitable for face portions of valves used in various plants such as a chemical plant and an atomic power plant, parts of jet pumps and sliding parts for various machines.

As is well known, a boiling water type atomic power plant is a system for generating power by revolving a turbine, using steam produced in a nuclear reactor. With the boiling water type nuclear reactor, water is heated into steam, which in turn is conducted through a main steam pipe to a turbine for its revolution. Steam gradually increases in humidity while being circulated for revolution of a turbine. Wet steam is conducted to a condenser after leaving a turbine to be converted into water. The water is returned to the reactor after being preheated by a feed water heater.

In the atomic power plant, some parts are subjected to little wear such as a pipe while used as a main steam pipe, other pipes provided for a condenser and feed water heater, the blades of the high pressure section of a turbine and the casing thereof are generally prepared from, for example, 18–8 stainless steel. On the other hand, parts subject to severe wear comprising erosion by high speed steam streams or violent cavitation erosions, such as, for example, the erosion shield provided for the terminal blade of the low pressure section of a turbine, the face section of valves, the sliding section of control rods and parts of a jet pump, should be built of wear-resistant material. These parts undergoing heavy erosions are generally formed of a cobalt-chromium-tungsten alloy sold under the trademark Stellite containing about 50% by weight of cobalt. However, the above-mentioned steel material and a cobalt-chromium-tungsten alloy sold under the trademark Stellite are gradually corroded or eroded during long use, giving rise to the growth of corrosion or errosion refuse such as irons or fine particles of metals. This corrosion or erosion refuse is accumulated in a reactor by circulation of steam or water.

When bombarded by neutrons emitted from fuel rods the corrosion or erosion refuse is presumably converted into radioactive corrosion or erosion product. Radioactive corrosion or erosion product arising from steel material has a very short half life, whereas radioactive corrosion or erosion product whose nucleus is formed of cobalt 60 derived from cobalt 59 contained in a cobalt-chromium-tungsten alloy sold under the trademark Stellite has a relatively long half life. Radiation sent forth from said radioactive corrosion or erosion product increases in amount as the run of an atomic power plant is prolonged. Therefore, it sometimes happens that when a periodic maintenance or repair of an atomic power plant is undertaken, the atomic power plant has to be stopped for a considerably long period in order to wait for the sufficient attenuation of radiation issuing from radioactive corrosion or erosion product deposited in the atomic power plant.

Hitherto, therefore, demand has been made to develop a wear-resistant material free from an element such as cobalt which gives rise to the growth of radioactive corrosion or erosion product having a long half life, in order to shorten the rest period of an atomic power plant such as much as possible for its efficient operation. Furthermore, a development of a wear-resistant alloy which does not contain cobalt has been demanded for a standpoint of diminished cobalt resources, reaction control in a chemical plant (or improvement in safety of an atomic power plant).

In order to satisfy these demands, a wear-resistant alloy including nickel as a base material is under development (disclosed in Japanese Provisional Patent Publication No. 9218/1978). However, a nickel-base wear-resistant alloy newly developed still has poorer wear resistance as compared with the conventionally used Stellite which is mentioned above. Therefore, an alloy excellent in wear resistance is intensively desired.

SUMMARY OF THE INVENTION

An object of the present invention is to provide a nickel-base wear-resistant alloy which has a novel composition and is excellent in wear resistance.

Another object of the present invention is to provide a wear-resistant alloy which is excellent in padding weld characteristics and is free from cobalt.

A further object of the present invention is to provide a wear-resistant alloy suitable for face portions of valves in various plants, parts for jet pumps and sliding parts for various machines.

A still further object of the present invention is to provide a wear-resistant alloy which is useful to provide an atomic power plant.

DETAILED DESCRIPTION OF PREFERRED EMBODIMENTS

The wear-resistant alloy according to the present invention is characterized by comprising, in terms of weight ratio, 10 to 45% of chromium, 3 to 15% of niobium, 4 to 20% of molybdenum, 0.01 to 2.0% of boron, and nickel as the remainder.

In the wear-resistant alloy according to the present invention, chromium is a component necessary to heighten the corrosion resistance of the alloy and the alloy body itself, and its proportion is within the range of 10 to 45% by weight, and preferably 15 to 40% by weight. When the proportion of chromium is less than 10% by weight, the above-mentioned effects are insufficient; when it exceeds 45% by weight, coarse initial crystal phases are excessively deposited at the manufacturing process, which makes it impossible to obtain the desired wear-resistance. Niobium is reacted with nickel in order to contribute to the buildup of the alloy body and the improvement in its wear-resistance, and its proportion is within the range of 3 to 15% by weight, and preferably 5 to 15% by weight. When the proportion of niobium is less than 3% by weight, the above-mentioned effects are poor; when it exceeds 15% by weight, the prepared alloy decreases in toughness and its mechanical strength is thus impaired. Molybdenum contributes to the buildup of the alloy body, the improvement in its corrosion resistance and the betterment of its wear resistance, and its proportion is within the range of 4 to 20% by weight, and preferably 4 to 10% by weight. When the molybdenum proportion is in excess of 20% by weight, the toughness of the obtained alloy is reduced. Boron contributes to the improvement in a running fluidity of the molten alloy at the time of its use, the buildup of the alloy body and the improvement in its wear resistance, and its proportion is within the range of 0.01 to 2.0% by weight. When the boron proportion is less than 0.01% by weight, the above-mentioned effects are unsatisfactory; when it is in excess of 2% by weight, the alloy decreases in toughness.

Although the wear-resistant alloy of the present invention comprises the aforesaid components as the essentials, a part of niobium may be replaced with tantalum. Further, a part of nickel may be replaced with 2 to 15% by weight, preferably 3 to 10% by weight of iron to the total amount of the alloy and a part of molybdenum may be replaced with 2 to 6% by weight, preferably 3 to 5% by weight of tungsten to the total amount of the alloy. Furthermore, the alloy may contain in suitable amounts manganese and silicon as a deacidification agent and a denitration agent, respectively, which are added at the melting step.

The wear-resistant alloy according to the present invention is prepared as follows:

The alloys corresponding to this range of compositions in the present invention may normally be worked by all known smelting processes. For instances, they may be worked in an induction furnace or a vacuum arc furnace.

Further, the alloys of the present invention may be cast by all the foundary process, particularly in sand or metal molds and dies, by the lost-wax process, direct casting, centrifugation, etc. These alloys may be suitable for making massive pieces or pieces of large or small dimensions, without risk of cracks or abnormal segregation.

Reference will be made to tests of wear-resistant properties and utility of the alloy according to the present invention, as follows:

EXAMPLES 1 TO 3

Alloy samples of compositions (% by weight) shown in Table 1 were first prepared and they were then melted for casting by use of a high-frequency vacuum induction melting furnace. Specimens were prepared by cutting the resultant cast articles and subjected to characteristic evaluation tests.

Each characteristic evaluation test includes a cavitation erosion test and a wear test by use of the Amsler testing machine. The cavitation erosion test was carried out in accordance with an ultrasonic vibration method [prescribed by 19th Corrosion Prevention Forum, Cavitation Section, 98th Committee (1972)] for three hours, and the obtained results are also shown in Table 1. The abrasion loss in Table 1 which represents a volume loss of a specimen per unit time was obtained by dividing a weight loss (mg) of a specimen during the test by a test time (min) and its density (g/cm$^3$) and multiplying the resultant value by $1\times10^6$.

Further, the wear test by use of the Amsler testing machine was carried out under the conditions of a test load of 30 Kg, a sliding wear distance of 1,000 m and employment of water as a lubricant. The obtained results are also exhibited in Table 1. Here, the abrasion wear in Table 1 represents a weight loss (mg) of a specimen during the test.

For comparison, test results of a nickel-chromium-boron system self-melting alloy (Comparative Example 4), a nickel-chromium-molybdenum-silicone system alloy (Comparative Example 5) and the like are also shown in Table 1.

TABLE 1

| Specimen | Chemical composition (% by weight) Cr | Nb | Mo | Mn | Si | B | Ni | Abrasion loss | Abrasion wear |
|---|---|---|---|---|---|---|---|---|---|
| Example 1 | 24.6 | 9.4 | 9.6 | 0.3 | 0.4 | 0.08 | Remainder | 1.3 | 41 |
| Example 2 | 24.5 | 8.2 | 9.4 | 0.5 | 0.3 | 1.5 | " | 0.8 | 15 |
| Example 3 | 36.0 | 6.4 | 4.8 | 0.4 | 0.4 | 0.3 | " | 1.0 | 24 |
| Comparative Example 1 | 20.3 | 5.7 | 11.0 | 0.4 | 0.3 | — | " | 2.8 | 275 |
| Comparative Example 2 | 10.6 | 4.5 | 6.0 | 0.3 | 0.5 | — | " | 5.6 | 643 |
| Comparative Example 3 | 35.1 | 2.4 | 4.6 | 0.5 | 0.2 | — | " | 3.4 | 486 |
| Comparative Example 4 | 11.5 | C 0.65 | Fe 4.25 | — | 3.75 | 2.50 | " | 26 | 105 |
| Comparative Example 5 | 15.0 | — | 32.0 | — | 3.0 | — | " | 3.7 | 147 |

EXAMPLE 4

The alloy having the composition (% by weight) shown in Table 2 was welded on a 18% Cr-8% Ni stainless steel plate in a padding form, and the padding welded portion of the plate was cut away to prepare a specimen. For the welded portion of the specimen, evaluation test was carried out in the same manner as mentioned above. The obtained results are also shown in Table 2.

TABLE 2

| Specimen | Chemical composition (% by weight) Cr | Nb | Mo | Mn | Si | B | Ni | Abrasion loss | Abrasion wear |
|---|---|---|---|---|---|---|---|---|---|
| Example 4 | 25.1 | 12.4 | 8.4 | 0.3 | 0.4 | 0.5 | Remainder | 1.1 | 29 |

When the padding weld of the alloy according to the present invention is given onto the 18% Cr-8% Ni stainless steel plate, some heat influence is exerted on the stainless steel plate, and for the purpose of eliminating the influence a common solution heat treatment may be taken. However, this solution heat treatment, even if taken, does not affect the mechanical characteristics of the alloy of the present invention. Further, when the padding weld of the alloy according to the present invention is given onto a carbon steel plate, some heat influence is exerted on the carbon steel plate, and for the removal of the heat influence, an austenitizing treatment and a tempering may be taken. However, these measures, even if taken, do not affect the mechanical characteristics of the alloy of the present invention, either.

The wear-resistant alloy specimens according to the present invention are all reduced in the abrasion loss and the abrasion wear and are excellent in padding weld characteristics as compared with conventional alloy specimens in Comparative Examples. Further, since not including any cobalt, the wear-resistant alloy of the present invention is suitable for parts used in various plants, for example, in chemical and atomic power fields and materials for sliding members in various machines.

We claim:

1. A wear-resistant alloy consisting essentially of, in terms of weight ratio, 10 to 45% of chromium, more than 5 to 15% of niobium, 4 to 20% of molybdenum, 0.3% to 2.0% of boron, and nickel as the remainder, said alloy having a degree of wear resistance rendering said alloy suitable for use in an atomic power plant.

2. A wear-resistant alloy according to claim 1, wherein said alloy consists essentially of, in terms of weight ratio, 15 to 40% of chromium more than 5 to 15% of niobium, 4 to 10% of molybdenum, 0.3% to 2.0% of boron, and nickel as the remainder.

3. In a control rod assembly for an atomic power plant, the improvement which comprises a sliding section for said control rod assembly made from a wear-resistant alloy according to claim 1.

4. In a valve, for an atomic power plant the improvement which comprises a face section made from a wear-resistant alloy according to claim 1.

5. A wear-resistant alloy according to claim 1, wherein said boron is present in an amount ranging from about 0.08 to 2.0% in terms of weight ratio.

6. A wear-resistant alloy according to claim 1, wherein said alloy is substantially cobalt-free.

7. A wear-resistant alloy according to claim 1, wherein said alloy has an abrasion loss value between about 0.8 and about 1.3.

* * * * *